US005745566A

United States Patent [19]
Petrella et al.

[11] Patent Number: 5,745,566
[45] Date of Patent: Apr. 28, 1998

[54] PORTABLE COMMUNICATION DEVICE HAVING REMOVABLE ESCUTCHEON ELEMENTS

[75] Inventors: Thomas Athony Petrella, Burlington, Wis.; Rudy Yorio, Mundelein, Ill.

[73] Assignee: Motorola, Inc., Schaumburg, Ill.

[21] Appl. No.: 730,189

[22] Filed: Oct. 15, 1996

[51] Int. Cl.$^6$ .................................................. H04M 1/00
[52] U.S. Cl. .................................... 379/433; 379/434
[58] Field of Search ................................ 379/433, 428, 379/434; 455/89, 90; D14/138, 248

[56] References Cited

U.S. PATENT DOCUMENTS

| | | |
|---|---|---|
| D. 309,901 | 8/1990 | Caesar . |
| 4,124,785 | 11/1978 | Seretny et al. . |
| 4,433,216 | 2/1984 | Isaacs . |
| 4,582,966 | 4/1986 | Sutton et al. . |
| 5,086,463 | 2/1992 | Vesely et al. . |
| 5,202,912 | 4/1993 | Breeden et al. . |
| 5,235,636 | 8/1993 | Takagi et al. . |
| 5,629,979 | 5/1997 | Domoleczny ................. 379/434 |

*Primary Examiner*—Jack Chiang
*Attorney, Agent, or Firm*—John G. Rauch

[57] ABSTRACT

A portable communication device (100) includes a first escutcheon (108) and a second escutcheon (110), both of which are removable by a user to alter or customize the cosmetic appearance of the portable communication device according to the user's preference. The first escutcheon (108) includes tabs (156, 158) on an inner surface (122). The tabs engage slots (160, 162) on a housing (112). The tabs and slots are aligned to brace the first escutcheon (108) against impact or other forces. The second escutcheon (110) includes an outer perimeter (204) which nestingly engages an inner perimeter (202) of a recessed portion (200) of the keypad cover. A boss (216) on the second escutcheon (110) engages an aperture (218) defined by the keypad cover (106) to retain the second escutcheon (110) on the keypad cover (106).

24 Claims, 8 Drawing Sheets

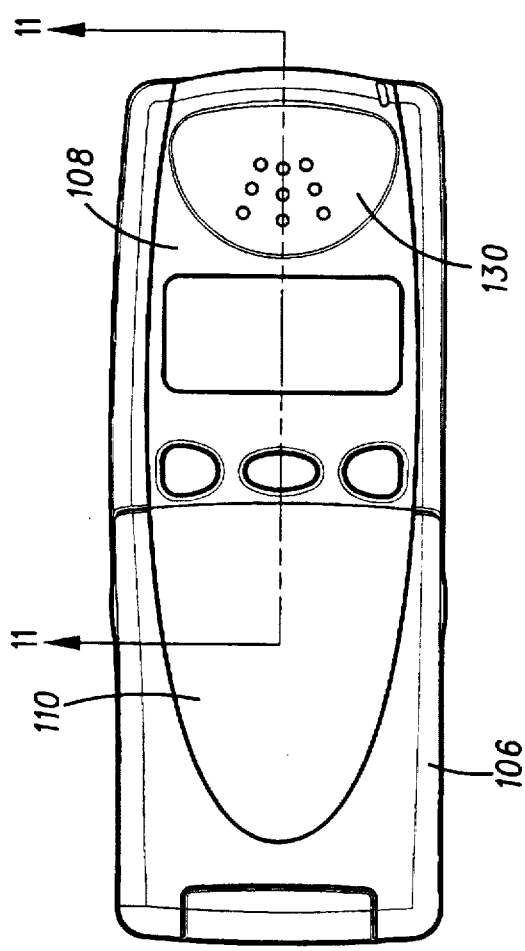
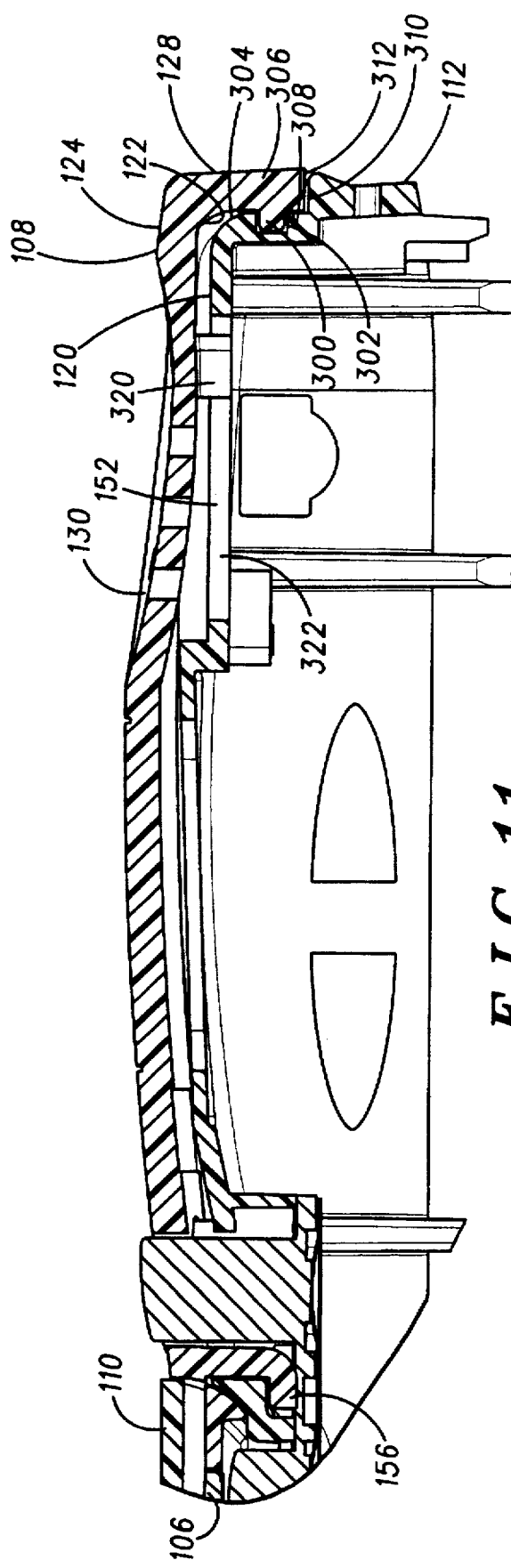

PORTABLE COMMUNICATION DEVICE HAVING REMOVABLE ESCUTCHEON ELEMENTS

FIELD OF THE INVENTION

The present invention generally relates to portable communication devices. More particularly, the present invention relates to a portable communication device having removable escutcheon elements.

BACKGROUND OF THE INVENTION

Portable communication devices are generally well-known in the art. Such portable communication devices include cellular telephones, cordless telephones and personal communicators. Communication devices traditionally communicate with a remote base station to provide wireless communications for a user. Communication devices have become a widely accepted form of wireless communications in the cordless and cellular radiotelephone markets.

Because of such wide acceptance, differentiating the appearance of individual portable communication devices has become an important requirement for the customer, the manufacturer, and the distributor of the communication device. Customers desire a unique appearance to satisfy their personal tastes and preferences. Manufacturers desire a unique appearance to provide a variety of appearances to their customers, and to provide a distinctive appearance for the manufacturer's own product. Distributors and retailers desire a unique appearance to differentiate themselves and their products in the marketplace and to promote their name brand. The desires of sellers and users to have a unique-looking portable communication device are communicated to the manufacturer so that the particular unique-looking portable telephone can be produced.

A communication device such as a radiotelephone is conventionally produced by assembling radiotelephone circuitry, including transceiver circuitry and user interface circuitry, within a housing. The user interface circuitry includes a display, a keypad, an earpiece and a microphone. The housing traditionally includes a rear housing, having a standard molded form, mated to a front housing having a different standard molded form. The front housing is adapted to provide a particular appearance by means of its molded contour, texture or color. Typically, the user interface elements are mounted inside the front housing and electrically connected to transceiver circuitry mounted in the back housing. The display and keypad may also each have a particular appearance. A particular front housing, a particular display and a particular keypad are selected by the manufacturer to give the portable radiotelephone an overall particular appearance.

A disadvantage of conventional production techniques for communication devices is the limited number of unique appearances available according to such techniques. The front and rear housings are standard in appearance and configuration. The same is true of keypads and displays. Minimal variation has heretofore been possible. In fact, the need to keep manufacturing costs low has required the use of only standard elements which may be readily and rapidly assembled at minimum cost.

Furthermore, conventionally-produced communication devices do not permit the user of the portable telephone to alter the appearance of the portable telephone once manufactured or purchased. Aftermarket companies have tried to meet the customer's need for the customer's own unique look by providing accessories, such as cases for holding portable telephones. However, these cases are clumsy, add weight, and have a limited effect on the appearance of the portable communication device. There remains a need to readily change the appearance of a portable communication device and to tailor the appearance to particular customers' desires.

One known communication device design attempts to provide an easily changeable escutcheon. This design permits the user to alter the appearance of the portable telephone after manufacture or purchase. The portable telephone includes a removable, snap-fit escutcheon and a housing. The escutcheon includes tabs disposed radially around the perimeter of the escutcheon which fit into corresponding slots on the housing. The manufacturer or user may alter the appearance of this portable telephone by removing the escutcheon from the housing and substituting another escutcheon.

The success of such a portable phone with a escutcheon has been limited by the inherently insecure nature of the attachment of the escutcheon to the housing. It has been observed that the escutcheon may come loose when the communication device is subjected to jarring, such as when the communication device is dropped, particularly given the many angles from which the communication device may be dropped. Different drop angles expose the escutcheon and housing to different forces. Attempts to anticipate these forces and design out susceptibility to them have met with limited success. Moreover, attempts to make the attachment of the escutcheon more solid by making the snap-fit connection more secure, for example by adding longer or stronger tabs, have defeated the goal of an easily changeable escutcheon.

Another known method of attaching a escutcheon to a communication device housing involves adding a latch mechanism to the communication device housing. When assembled, a post on the inner surface of the escutcheon extends through a hole in the housing and engages a latch keeper on the rear of the housing. The latch keeper slides between engaging and disengaging positions to release the post and permit interchange of escutcheons.

The latch mechanism has not been an ideal solution because it adds to the cost of the communication device. Additional parts are needed along with additional manufacturing steps to assemble the housing with the latch mechanism. Because communication devices such as radiotelephones are consumer products, their commercial success requires minimization of product cost, including manufacturing cost. Addition of a latch mechanism prevents cost minimization.

Other known methods of attaching an escutcheon to a communication device housing include using one or more screws as well as more permanent methods such as adhesive. None of these known methods has successfully permitted the manufacturer to tailor the appearance of the portable communication device to particular users or permitted the user to readily alter the appearance of the portable communication device after manufacture or purchase.

Another shortcoming of conventional designs is their limitation to a single removable escutcheon element. Such an element generally covers most of the front surface of a communication device, leaving apertures for keypad keys and a display. However, to further differentiate product appearance in a crowded marketplace, manufacturers and distributors wish to have multiple removable and interchangeable elements to permit mixing and matching and tailoring product appearance to the greatest degree possible, as well as to permit the user maximum flexibility in customizing the appearance of the portable communication device.

Accordingly, there is a need for a portable communication device which can be manufactured with an individually tailored cosmetic appearance and which may be altered and customized by a subsequent purchaser while ruggedly retaining the customizing elements.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 10 is a front plan view of the second embodiment of the portable communication device of FIG. 1; and FIG. 11 is a cross sectional view taken along line 11—11 in FIG. 10;

DETAILED DESCRIPTION OF A PREFERRED EMBODIMENT

Figure 1:
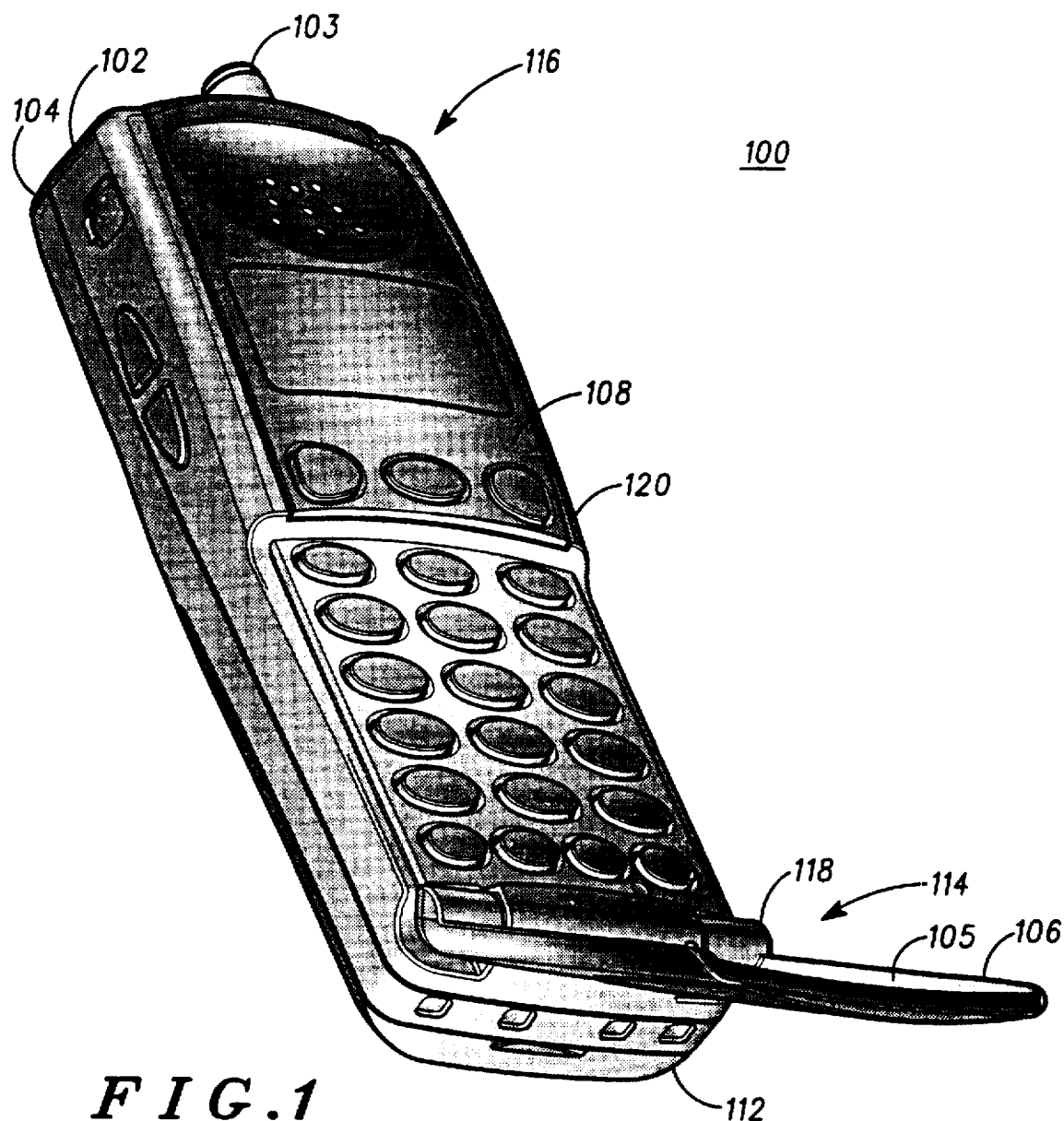
FIG. 1 is an isometric view of a portable communication device having a keypad cover in an open position.
Figure 2:
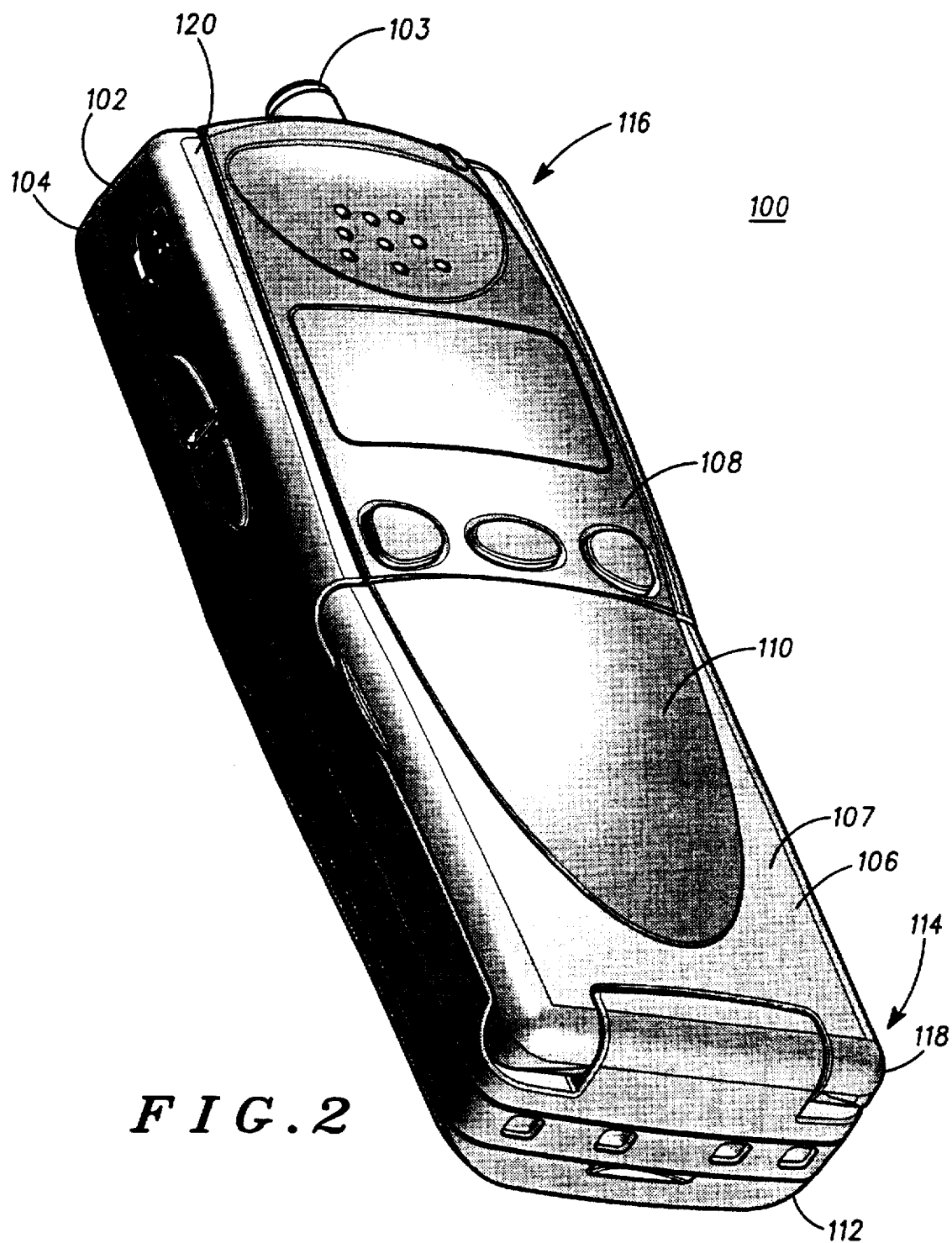
FIG. 2 is an isometric view of the portable communication device of FIG. 1 having the keypad cover in a closed position.

Referring now to FIGS. 1 and 2, a portable communication device 100 includes a front housing 102, a rear housing 104, a keypad cover 106, a first escutcheon 108 and a second escutcheon 110. Together, when assembled, the front housing 102 and rear housing 104 form a housing 112. The housing 112 has a first end 114 and a second end 116. The housing 112 further has a front surface 120, which is also the front surface of front housing 102.

The keypad cover 106 is movably disposed on the first end 114 of the housing 112. The keypad cover 106 is movable between an open position illustrated in FIG. 1 and a closed position illustrated in FIG. 2. The keypad cover 106 has an inner surface 105 and an outer surface 107. While the keypad cover 106 is illustrated as being rotatable about a hinge 118 between the open and closed positions, other keypad configurations, including sliding keypad covers, may be used as well. Lastly, an antenna 103 is disposed on the second end 116 of the housing 112.

Figure 3:
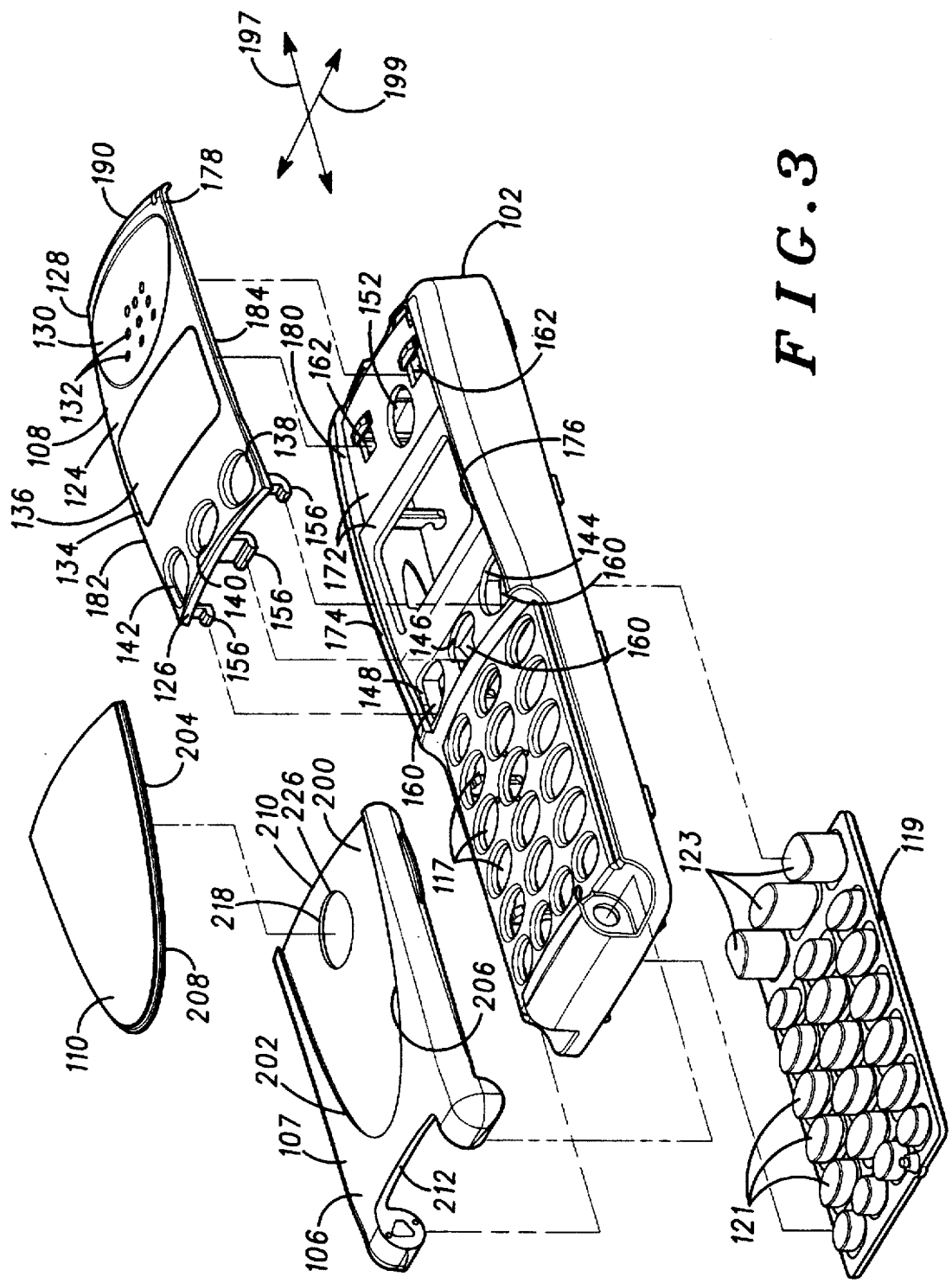
FIG. 3 is a first exploded view of a portion of the portable communication device of FIG. 1.
Figure 4:
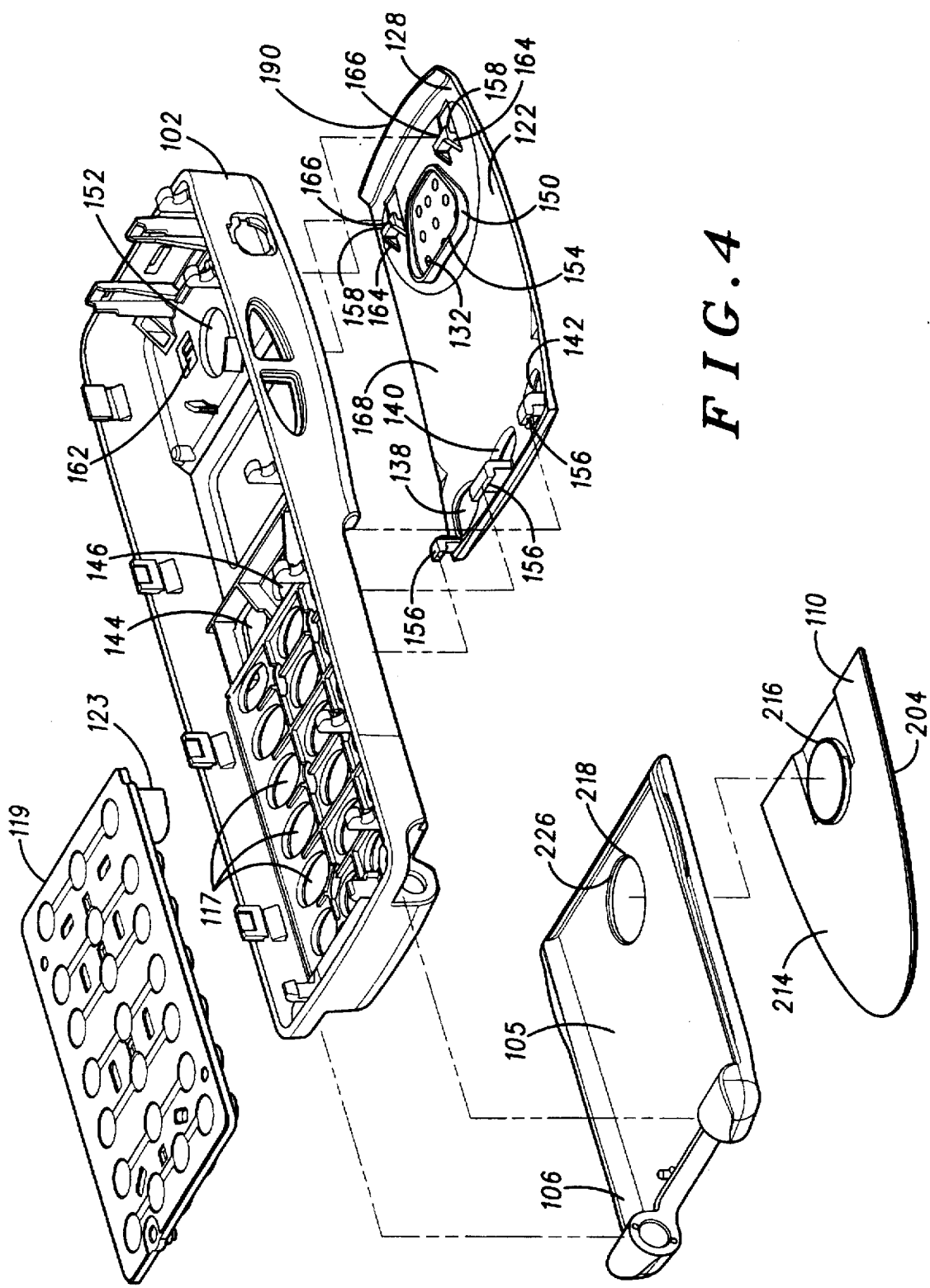
FIG. 4 is a second exploded view of a portion of the portable communication device of FIG. 1.

Referring now to FIGS. 3 and 4, they show exploded views of a portion of the portable communication device 100. Illustrated in FIGS. 3 and 4 are the front housing 102, the keypad cover 106, the first escutcheon 108, the second escutcheon 110 and a keypad 119. The keypad 119 includes a plurality of keys 121 including control keys 123. The housing 112 defines a plurality of keyholes 117. The keypad 119 has a like plurality of keys 121 positioned to extend through the plurality of keyholes 117 when the keypad 119 is located within the housing 112. Preferably, the keypad is integrally formed from a single piece of flexible material. When depressed, the keys 121 and control keys 123 deform and engage keyboard elements on a keyboard mounted within the housing 112.

To better illustrate the invention, the rear housing 104 is omitted and only the front housing 102 is illustrated in FIGS. 3 and 4. However, it is to be understood that the housing 112 of the assembled portable communication device includes both the rear housing 104 and front housing 102. References to housing 112 and front housing 102 will be used interchangeably herein. For illustrative purposes, a longitudinal axis 197 and a latitudinal axis 199 are defined (FIG. 3).

Operating circuitry, including a transceiver, control circuit, user interface and battery, are contained within the housing 112. The user interface typically includes a speaker, microphone, display and keyboard.

The first escutcheon 108 is removably disposed on the front surface 120, proximate the second end 116 of the housing 112. The first escutcheon 108 includes an inner surface 122 and an outer surface 124. The first escutcheon 108 further includes a first end 126 and a second end 128. A portion of the outer surface 124 proximate the second end 128 is contoured to define an ear cup 130. The first escutcheon 108 defines a plurality of holes 132 at the ear cup 130. The ear cup 130 and holes 132 permit acoustic coupling between the speaker contained in the housing 112 and a user's ear. The first escutcheon 108 further defines an aperture 134 which is filled by a lens 136 in the illustrated embodiment. The lens 136 in the illustrated embodiment is a clear plastic element which permits viewing of the display contained within the housing 112. In an alternative embodiment, the lens 136 may be separate from the first escutcheon and permanently fixed to the housing 112.

The first escutcheon 108 further defines a plurality of holes including hole 138, hole 140, and hole 142. When the first escutcheon 108 is disposed on the front housing 102, the holes 138, 140 and 142 align with corresponding holes defined in the front housing 102, including hole 144, hole 146 and hole 148, respectively. The holes 138, 140 and 142 and the holes 144, 146 and 148 are configured to provide access to the control keys 123 of the keypad 119. While three sets of holes, for three control keys 123, are illustrated, it is to be understood that any suitable number of keys and corresponding holes could be provided.

The inner surface 122 of the first escutcheon 108 includes an acoustic seal 150 disposed about the holes 132. The acoustic seal 150 is sized to surround an acoustic aperture 152 defined by the front housing 102. The acoustic aperture 152 is located adjacent to the speaker mounted within the housing 112 when the portable communication device 100 is assembled. The acoustic seal 150 ensures good acoustic coupling among the speaker, the acoustic aperture 152, the holes 132 and the ear cup 130.

When the first escutcheon 108 is disposed on the front surface 120 of the housing 112, the perimeter 154 of the acoustic seal 150 engages the front surface 120 to support the first escutcheon 108 against the front surface 120. In this manner, the acoustic seal 150 prevents the first escutcheon 108 from flexing inwardly (toward the front surface 120) in response to an impact on the first escutcheon 108.

The first escutcheon 108 further includes one or more first tabs 156 disposed on the inner surface 122 proximate the first end 126 of the first escutcheon 108. In the illustrated embodiment, the one or more first tabs 156 includes three tabs; however, any suitable number may be used. The first escutcheon 108 still further includes one or more second tabs 158 disposed on the inner surface 122 proximate the second end 128 of the first escutcheon 108. In the illustrated embodiment, the one or more second tabs 158 includes two tabs; however, any suitable number may be used.

To retain the first escutcheon 108 on the housing 112, the housing 112 includes one or more first slots 160 on the front surface 120 positioned to receive the one or more first tabs 156. In the illustrated embodiment, the one or more first slots 160 are formed commonly with the holes 138, 140, 142 provided for the control keys 123. This provides the benefit of minimizing the number of apertures that must be formed in the first escutcheon 108, thus maximizing the strength and minimizing the manufacturing cost of the first escutcheon 108. In addition, when the one or more first tabs 156 are inserted in the one or more first slots 160, the control keys 123 which extend through the holes 138, 140, 142 press against the one or more first tabs 156 and help to retain the one or more first tabs 156 in the one or more first slots 160. This retains the first escutcheon 108 securely, yet, because the control keys 123 are flexible, permits ready removal of the first escutcheon 108. Also to retain the first escutcheon 108 on the housing 112, the housing 112 includes one or more second slots 162 on the front surface positioned to receive the one or more second tabs 158.

Figure 6:
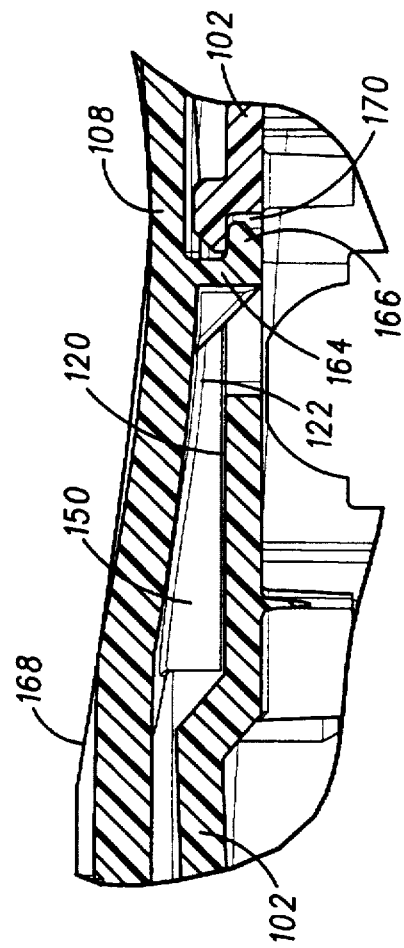
FIG. 6 is a cross sectional view taken along line 6—6 in FIG. 5.
Figure 5:
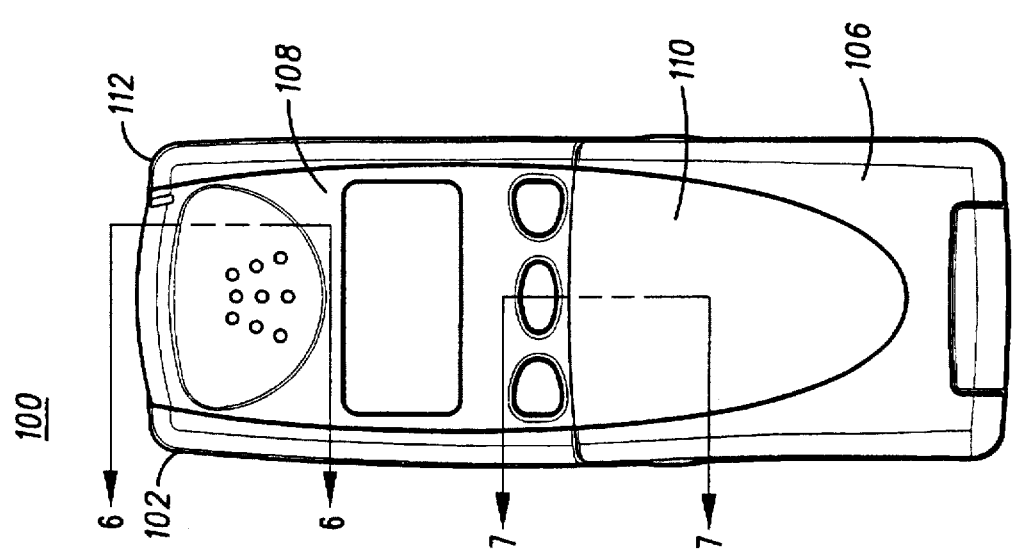
FIG. 5 is a front plan view of the portable communication device of FIG. 1.
Figure 8:
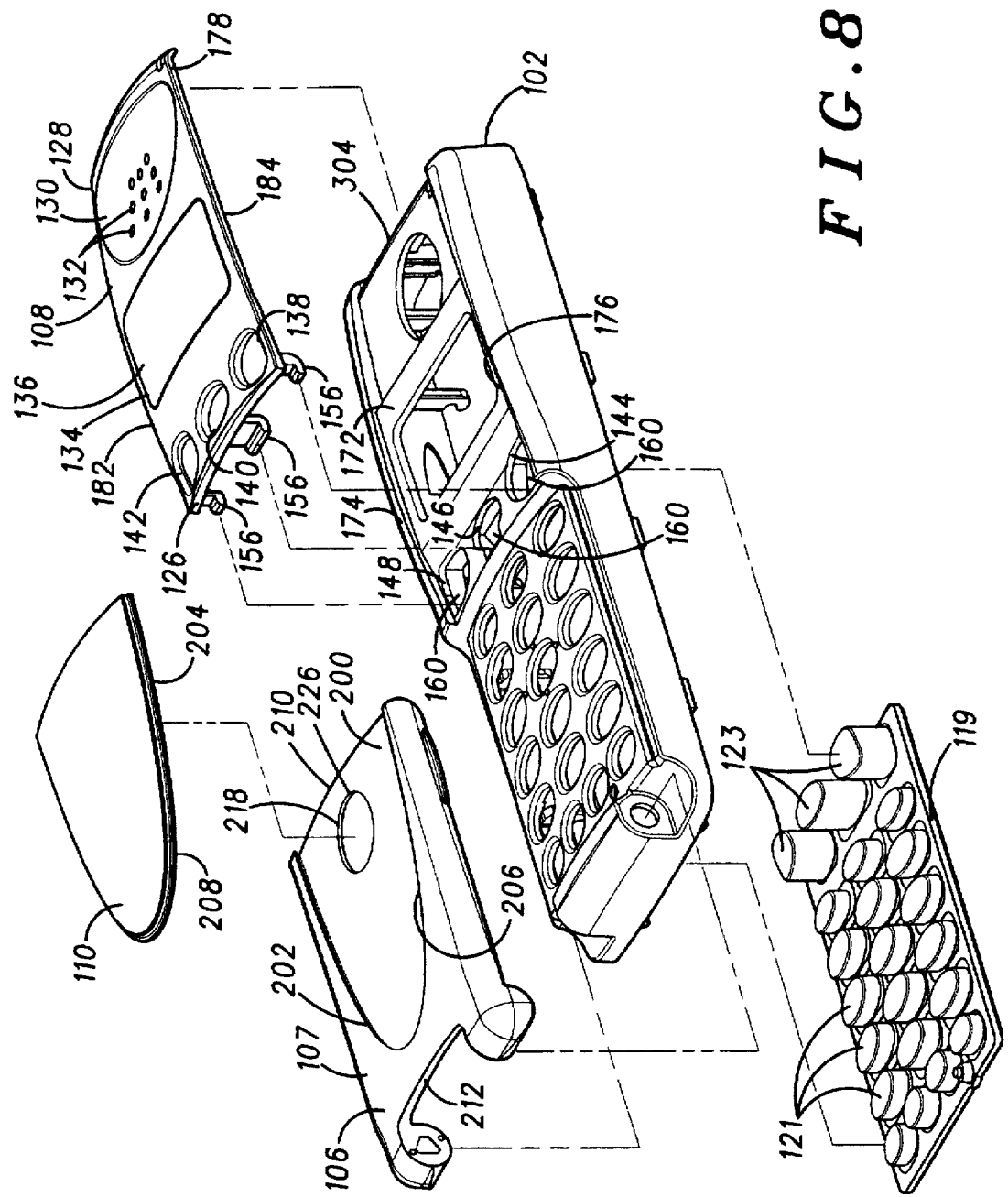
FIG. 8 is a first exploded view of a second embodiment of the portable communication device of FIG. 1.

The one or more first tabs 156 and the one or more second tabs 158 are designed to ensure that the first escutcheon 108 is securely retained on the housing 112. Referring to FIG. 5, it shows a front elevation view of the portable communication device 100. FIG. 6 is a cross sectional view taken along section A1—A1 in FIG. 5. Each of the one or more second tabs 158 includes a body 164 disposed on the inner surface 122 of the first escutcheon 108 and a catch portion 166 extending from the body 164 in a direction away from a center region 168 of the first escutcheon 108. The catch portion 166 engages a corresponding slot of the 170 (FIG. 6) of the one or more second slots 162 for securely retaining the first escutcheon 108 on the housing 112. Preferably, each of the one or more first slots is similarly arranged, with a catch portion extending from a body in a direction away from a center region 168 of the first escutcheon 108.

The one or more first tabs 156 and the one or more second tabs 158 engage their corresponding slots with a catch portion extending away from the center region 168 of the first escutcheon 108. The ensures that, in the event of an impact or other imposed force, the first escutcheon 108 will remain attached to the front surface 120 of the housing 112. Forces which would tend to dislodge the first escutcheon 108 in a direction toward the keypad cover 106 are opposed by the one or more first tabs 156 in their corresponding slots. Similarly, forces which would tend to dislodge the first escutcheon 108 in a direction away from the keypad cover 106 are opposed by the one or more second tabs 156 in their corresponding slots. Thus, the first escutcheon 108 is braced against impact or other forces along the longitudinal axis 197 of the portable communication device 100.

To brace the first escutcheon 108 against other forces along the latitudinal axis 199 of the portable communication device 100, the front surface 120 of the housing 112 preferably has a recessed portion 172 (FIG. 3) sized to receive the first escutcheon 108. The recessed portion is bounded by a side rail 174 and a side rail 176. When the first escutcheon 108 is disposed on the front surface 120 of the housing 112, the side rail 174 engages the first escutcheon 108. The first escutcheon 108 has an outer perimeter 178 and the recessed portion 172 has an inner perimeter 180. A portion of the outer perimeter, such as a left side 182 and a right side 184, engages a portion of the inner perimeter, such as side rail 174 and side rail 176, respectively, for securely retaining the first escutcheon 108 on the housing 112. This braces the first escutcheon 108 against latitudinally directed forces. This also permits a flush fit of the first escutcheon 108 in the front housing 102, which enhances the visual appeal of the portable communication device 100.

For ready removal of the first escutcheon 108 from the housing 112, the first escutcheon 108 includes an edge 190 at the second end 128 of the first escutcheon 108. The first escutcheon 108 flexes in response to a force imposed at the edge 190 in a direction toward the center region 169 of the first escutcheon 108. The catch portion 166 (FIG. 6) of the one or more second tabs 158 withdraws from the corresponding slot 170 in response to the first escutcheon 108 flexing.

The withdrawal of the catch portion 166 in this manner permits ready removal of the first escutcheon 108 from the housing 112. The user merely has to apply finger pressure along the edge 190 in a direction toward the center region 169 of the first escutcheon 108 sufficient to flex the first escutcheon 108 and permit lifting the first escutcheon 108 from the housing 112. Presence of the antenna 103 (FIG. 1) reduces the likelihood that force sufficient to dislodge the first escutcheon 108 will be imposed on the edge 190 when the portable communication device 100 is dropped or otherwise jarred. Alternatively, for added security or in the absence of the antenna 103, the housing 112 could be extended slightly at the second end 116 so that the edge 190 is flush fit or is recessed.

In the illustrated embodiment, the outer surface 124 of the first escutcheon 108 is crowned for securely retaining the first escutcheon 108 on the housing in response to forces imposed on the outer surface 124 of the first escutcheon 108. In particular, as can be seen in FIG. 3, the outer surface 124 is crowned or bowed upward in a direction away from the housing 112. The left side 182 and right side 184 are flush fit with the side rail 174 and side rail 176. However, the center region 168 is raised slightly above the flush fit sides. This has the effect of deflecting any forces imposed on the outer surface 124 of the first escutcheon. It also has the effect of more securely engaging the first escutcheon 108 and the housing 112 in response to any imposed forces. The first escutcheon 108 flexes along a longitudinal axis in response to the force and the left side 182 and right side 184 are pressed against side rail 174 and side rail 176, respectively.

Turning now to securement of the second escutcheon 110, the keypad cover 106 in accordance with the present invention includes a recessed portion 200 sized to retain the second escutcheon 110 (FIG. 3). In the illustrated embodiment, the recessed portion 200 includes an inner perimeter 202 and the second escutcheon 110 includes an outer perimeter 204. A portion 206 of the inner perimeter 202 engages a portion 208 of the outer perimeter 204 to retain the second escutcheon 110. Specifically, the portion 206 of the inner perimeter 202 includes the extended, arcuate portion of the inner perimeter 202. The portion 208 of the outer perimeter 205 includes the extended, arcuate portion of the outer perimeter 204.

The second escutcheon 110 and the corresponding recessed portion 200 may be any shape. However, an arcuate shape, such as the elliptical shape shown in the illustrated embodiment, maximizes the engaging perimeter of both the recessed portion 200 and the second escutcheon 110.

In the illustrated embodiment, the inner perimeter 202 of the recessed portion 200 is bevelled outwardly and downwardly to form a notch. The outer perimeter 204 of the second escutcheon 110 is similarly bevelled to engage and nest with the inner perimeter 202. With this arrangement, the second escutcheon 110 may be slipped into the recessed portion 200 of the keypad cover 106, moving from the distal end 210 toward the proximal end 212 of the keypad cover 106. When fully inserted into the recessed portion 200, the bevelled outer perimeter 204 of the second escutcheon 110 nestingly engages the bevelled inner perimeter 202 of the recessed portion 200 to retain the second escutcheon 110 within the recessed portion 200.

To further ensure that the second escutcheon 110 is retained within the recessed portion under conditions of dropping or jarring, the second escutcheon 110 has an inner surface 214 including a boss 216. The keypad cover 106 defines an aperture 218 sized to receive the boss 216. As the outer perimeter 204 of the second escutcheon 110 nestingly engages the inner perimeter 202 of the recessed portion 200, the boss 216 enters the aperture 218 and is snugly retained therein. In this manner, the second escutcheon 110 is fixed to the keypad cover 106.

Figure 7:
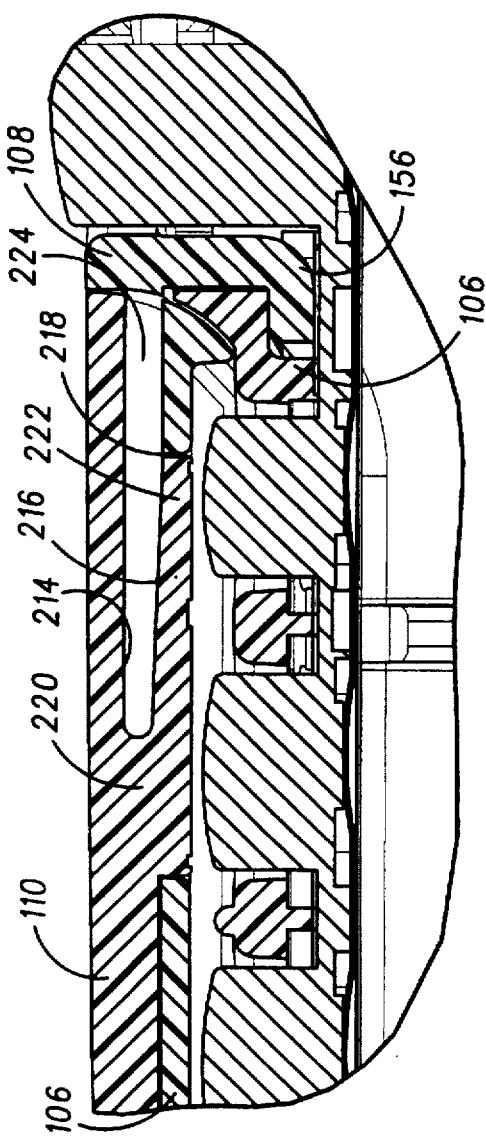
FIG. 7 is a cross sectional view taken along line 7—7 in FIG. 5; communication device of FIG. 1.

FIG. 7 is a cross sectional view taken along line 7—7 in FIG. 5. FIG. 7 illustrates the boss 216 retained within the aperture 218. In the illustrated embodiment, the boss 216 is attached to the inner surface 214 of the second escutcheon 110 at a base 220. The boss 216 includes a flexible portion 222. The flexible portion 222 defines a notch 224 between the flexible portion 222 and the inner surface 214 of the second escutcheon 110. To assist in retaining the boss 216 in the aperture 218, the notch 224 engages a lip 226 (FIGS. 3–4) of the aperture 218.

For ready removal of the second escutcheon 110 from the keypad cover 106, the second escutcheon 110 is configured to flex in response to a force imposed on the boss 216. This force, combined with an opposing force along the sides of the keypad cover 106, allows the second escutcheon 110 to flex, releasing the outer perimeter 204 from the inner perimeter 202. The second escutcheon 110 can then be slipped out of the recessed portion 200 for removal and replacement.

Referring now to FIGS. 8–11, a second embodiment of the portable communication device 100 provides an alternative for securing the first escutcheon 108 to the housing 112. In the alternative embodiment, a rib 300 is included on the inner surface 122 of the first escutcheon 108 at the second end 128 of the first escutcheon 108. The housing 112 forms a corresponding slot 302 at the second end 116 of the housing 112. The slot 302 is sized to retain the rib 300 when the first escutcheon 108 is disposed on the front surface 120 of the housing.

To ensure a secure fit of the first escutcheon 108 on the front housing 102, the front housing 102 according to the second embodiment defines a recess 304 at the second end 116 of the front housing 102. The second end 128 of the first escutcheon 108 includes an extended portion 306 sized to fit into the recess 304. The rib 300 is formed on the inner surface 308 of the extended portion 306. The recess 304 is bounded by a mating surface 310 and the extended portion 306 terminates in an end portion 312. When the first escutcheon 108 is disposed on housing 112, the rib is retained in the slot 302 and the end portion 312 engages the mating surface 310. This reduces or eliminates vertical movement (from the perspective of the cross sectional view of FIG. 11) of the first escutcheon 108 relative to the housing 112, thereby retaining the first escutcheon 108 on the housing even when subject to dropping or jarring.

The rib 300 and the slot 302 are illustrated as a single rib and single slot. However, two or more ribs and slots may be substituted where suitable.

To further ensure a secure fit of the first escutcheon 108 on the front housing 102, the first escutcheon 108 includes one or more struts 320 disposed on the inner surface 122 of the first escutcheon 108. The struts 320 are positioned to fit within the acoustic aperture 152, engaging the side wall 322 of the acoustic aperture 152. By engaging the side wall 322 of the acoustic aperture 152, the struts 320 reduce or eliminate lateral movement of the first escutcheon 108 relative to the housing 112, thereby retaining the first escutcheon 108 on the housing even when subject to dropping or jarring.

Figure 9:
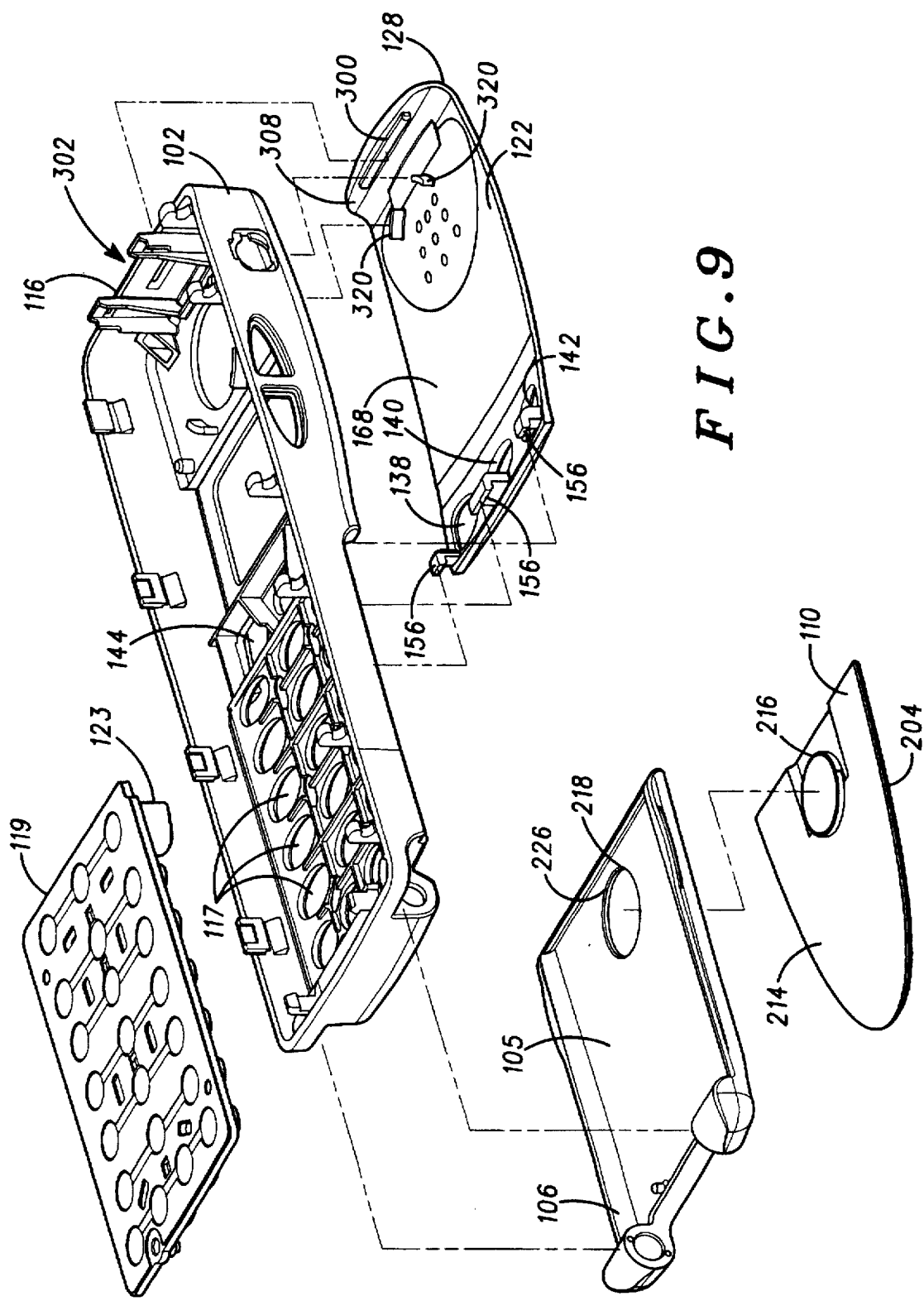
FIG. 9 is a second exploded view of the second embodiment of the portable communication device of FIG. 1.

In FIG. 9, two struts 320 are illustrated; however, any suitable number of struts, including a single ring fully engaging the perimeter of the acoustic aperture 152, could be provided. Alternatively, the struts 320 could be configured to engage the front surface 120 of the housing 112 to prevent the first escutcheon 108 from bowing inwardly in response to forces imposed on the outer surface 124 of the first escutcheon 108.

For enhanced user convenience, it is envisioned that a user interface kit for the portable communication device 100 will be offered separately from the portable communication device 100 itself. In this embodiment, the portable communication device includes a housing 112 having a first end 114 and a second end 116, a front surface 120 and a keypad cover 106 movably disposed on the first end 114 of the housing 112 (FIG. 1). The user interface kit comprises a first escutcheon 108 configured to be removably disposed on the front surface 120 of the housing 112 proximate the second end 116 and a second escutcheon 110 configured to be removably disposed on the outer surface 107 of the keypad cover 106. In this manner, the first escutcheon 108 and the second escutcheon 110 permit customizing the appearance of the portable communication device 100.

In an alternative embodiment, the user interface kit further includes a keypad 119 configured to be located within the housing 112. Inclusion of the keypad 119 with the user interface kit permits the cosmetic appearance of the portable communication device to be customized even further. Different keypads such as keypad 119 can be provided including different appearances for the keys 121. Keys 121 may have different colors or be imprinted with different characters (such as kanji characters for the Japan market), or modified in any other suitable manner. Construction and assembly of the user interface kit is in accordance with the principles of the present invention described above.

As can be seen from the foregoing, the present invention provides a portable communication device which can be manufactured with an individually tailored cosmetic appearance and which may be altered and customized by a subsequent purchaser while ruggedly retaining the customizing elements. The first escutcheon may be snap-fit to the front of the housing, eliminating the need for latch mechanisms. The tabs and slots for the snap fit are designed to retain the first escutcheon on the housing despite forces applied from any direction. In fact, such forces tend to temporarily tighten the fit to keep the first escutcheon secure. The second escutcheon may also be snap-fit to the keypad cover, again eliminating the need for expensive latch mechanisms. Both the first escutcheon and the second escutcheon may be removed by a user applying finger forces to flex and dislodge the escutcheons. This permits the cosmetic appearance to be tailored and altered to a particular user's preference. A user interface kit provides further flexibility by permitting the user to purchase only the interchangeable elements required to customize the portable communication device.

While a particular embodiment of the present invention has been shown and described, modifications may be made. For example, the second escutcheon is shown with a single, round boss. The boss may alternatively be any shape and may be replaced with any number of bosses. It is therefore intended in the appended claims to cover all such changes and modifications which fall within the true spirit and scope of the invention.

What is claimed is:

1. A portable communication device comprising:

a housing including a rear housing and a front housing, the front housing having a front surface and including a first end and a second end;

a keypad cover movably disposed on the first end of the front housing, the keypad cover having an inner surface and an outer surface;

a first escutcheon removably disposed on the front surface proximate the second end of the housing; and a second escutcheon removably disposed on the outer surface of the keypad cover, the first escutcheon and the second escutcheon configured for removable attachment to the front surface of the front housing for customizing appearance of the portable communication device.

2. A portable communication device as recited in claim 1 wherein the first escutcheon includes:

an inner surface and an outer surface;

a first end and a second end;

one or more first tabs disposed on the inner surface proximate the first end of the first escutcheon;

one or more second tabs including a catch portion disposed on the inner surface proximate the second end of the first escutcheon;

a center region;

an edge at the second end of the first escutcheon;

wherein the front housing includes one or more first slots on the front surface positioned to receive the one or more first tabs; and one or more second slots on the front surface positioned to receive the catch portion of the one or more second tabs, the first escutcheon flexing in response to a force imposed at the edge in a direction toward the center region of the first escutcheon, the catch portion of the one or more second tabs withdrawing from the one or more second slots in response to the first escutcheon flexing.

3. A portable communication device as recited in claim 2 wherein each of the one or more second tabs includes a body disposed on the inner surface of the first escutcheon and a catch portion extending from the body in a direction away from a center region of the first escutcheon, the catch portion engaging a corresponding slot of the one or more second slots for securely retaining the first escutcheon on the front housing.

4. A portable communication device as recited in claim 3 wherein the first escutcheon includes an edge at the second end of the first escutcheon, the first escutcheon flexing in response to a force imposed at the edge in a direction toward the center region, the catch portion of the one or more second tabs partially withdrawing from the corresponding slot in response to the first escutcheon flexing, thereby permitting ready removal of the first escutcheon from the front housing.

5. A portable communication device as recited in claim 1 wherein the front surface of the front housing has a recessed portion sized to receive the first escutcheon and wherein the first escutcheon has an outer perimeter and the recessed portion has an inner perimeter a portion of the outer perimeter engaging a portion of the inner perimeter for securely retaining the first escutcheon on the front housing.

6. A portable communication device as recited in claim 5 wherein the first escutcheon has a left side and a right side and the recessed portion is bounded by a first side rail and a second side rail, the left side engaging the first side rail and the right side engaging the second side rail when the first escutcheon is retained on the front housing to brace the first escutcheon against forces along a latitudinal axis of the portable communication device.

7. A portable communication device as recited in claim 5 wherein an outer surface of the first escutcheon is crowned for securely retaining the first escutcheon on the front housing in response to forces imposed on the outer surface of the first escutcheon.

8. A portable communication device as recited in claim 1 wherein the first escutcheon includes:

an inner surface and an outer surface;

a first end and a second end;

one or more tabs disposed on the inner surface proximate the first end of the first escutcheon;

a rib disposed on the inner surface of an extended portion of the first escutcheon at the second end of the first escutcheon;

wherein the front housing defines a recess at the second end, the recess sized to receive the extended portion of the first escutcheon, the recess bounded by a mating surface, and wherein the first housing defines one or more slots on the front surface positioned to receive the one or more tabs; and a slot at the second end of the front housing sized to retain the rib when the first escutcheon is disposed on the front surface of the front housing, the end portion engaging the mating surface to reduce movement of the first escutcheon relative to the housing.

9. A portable communication device as recited in claim 1 wherein the outer surface of the keypad cover includes a recessed portion sized to retain the second escutcheon.

10. A portable communication device as recited in claim 9 wherein the recessed portion includes an inner perimeter and the second escutcheon includes an outer perimeter, a portion of the inner perimeter engaging a portion of the outer perimeter to retain the second escutcheon.

11. A portable communication device as recited in claim 10 wherein the inner perimeter is bevelled outwardly and downwardly and the outer perimeter is similarly bevelled to retain the second escutcheon.

12. A portable communication device as recited in claim 1 wherein the second escutcheon has an inner surface including a boss and the keypad cover defines an aperture sized to receive the boss when the second escutcheon and the keypad cover are assembled.

13. A portable communication device as recited in claim 12 wherein the second escutcheon is configured to flex in response to a force imposed on the boss for ready removal of the second escutcheon from the keypad cover.

14. A user interface kit for a portable communication device, the portable communication device including a housing which includes a rear housing and a front housing, the front housing having a front surface and a first end and a second end, and a keypad cover movably disposed on the first end of the front housing, the user interface kit comprising:

a first escutcheon configured to be removably disposed on the front surface of the front housing proximate the second end; and a second escutcheon configured to be removably disposed on an outer surface of the keypad cover, the first escutcheon and the second escutcheon for customizing appearance of the portable communication device.

15. A user interface kit for a portable communication device as recited in claim 14 further comprising a keypad configured to be located within the housing.

16. A user interface kit for a portable communication device as recited in claim 15 wherein the housing defines a plurality of keyholes and wherein the keypad comprises a like plurality of keys positioned to extend through the plurality of keyholes when the keypad is located within the housing.

17. A user interface kit for a portable communication device as recited in claim 14 wherein the front housing includes one or more first slots on the front surface and one or more second slots, and wherein the first escutcheon comprises:

an inner surface and an outer surface;

a first end and a second end;

one or more first tabs disposed on the inner surface proximate the first end of the first escutcheon, each of the one or more first tabs being positioned to engage a respective slot of the one or more first slots, each of the one or more first tabs including a catch portion extending from the inner surface in a direction away from a center region of the first escutcheon; and one or more second tabs disposed on the inner surface proximate the second end of the first escutcheon, each of the one or more second tabs being positioned to engage a respective slot of the one or more second slots, each of the one or more second tabs including a catch portion extending from the inner surface in a direction away from a center region of the first escutcheon, the one or more first tabs and the one or more second tabs securely retaining the first escutcheon on the front housing when the first escutcheon is disposed on the front surface of the front housing.

18. A user interface kit for a portable communication device as recited in claim 14 wherein the outer surface of the keypad cover includes a recessed portion and wherein the second escutcheon is sized to fit the recessed portion.

19. A user interface kit for a portable communication device as recited in claim 18 wherein the recessed portion includes a bevelled inner perimeter and the second escutcheon comprises an outer perimeter similarly bevelled to retain the second escutcheon in the recessed portion.

20. A user interface kit for a portable communication device as recited in claim 14 wherein the keypad cover defines an aperture and wherein the second escutcheon comprises an inner surface including a boss sized to extend through the aperture when the second escutcheon is disposed on an outer surface of the keypad cover.

21. A portable communication device having a configuration which may be customized by a user, the portable communication device comprising:

a housing having a front surface which defines a recessed portion, the recessed portion being bounded by a first side rail and a second side rail;

a keypad cover movably disposed on a first end of the housing, the keypad cover having an inner surface and an outer surface and being movable between an open position and a closed position, the outer surface of the keypad cover defining a recessed area, the recessed area having a bevelled perimeter;

a first escutcheon removably disposed in the recessed portion of the housing, the first escutcheon having a left side which engages the first side rail and a right side which engages the second side rail, the first escutcheon having an outer surface which is crowned to deflect a force imposed on the outer surface to resist dislodging of the first escutcheon by the force; and a second escutcheon removably disposed on the outer surface of the keypad cover, the second escutcheon having an outer perimeter bevelled to correspond to the bevelled perimeter of the recessed area of the keypad cover, the outer perimeter engaging the bevelled perimeter when the second escutcheon and the keypad cover are assembled, the first escutcheon and the second escutcheon configured for removable attachment to the front surface of the front housing for customizing appearance of the portable communication device.

22. A portable communication device as recited in claim 21 wherein the second escutcheon has an inner surface including a boss and the keypad cover defines an aperture sized to receive the boss when the second escutcheon and the keypad cover are assembled.

23. A portable communication device as recited in claim 22 wherein the second escutcheon is configured to flex in response to a force imposed on the boss for ready removal of the second escutcheon from the keypad cover.

24. A portable communication device as recited in claim 23 wherein the outer perimeter disengages the bevelled perimeter when the second escutcheon flexes to permit removal of the second escutcheon from the keypad cover.

* * * * *